United States Patent [19]

Couch

[11] Patent Number: 4,650,977
[45] Date of Patent: Mar. 17, 1987

[54] AUTOMATIC SELF SERVICE MACHINE SYSTEM AND METHOD

[75] Inventor: Wilfred R. Couch, Lake Wylie, S.C.

[73] Assignee: International Business Machines Corporation, Armonk, N.Y.

[21] Appl. No.: 564,474

[22] Filed: Dec. 21, 1983

[51] Int. Cl.$^4$ .............................................. G06F 15/30
[52] U.S. Cl. ..................................... 235/379; 235/381
[58] Field of Search .............................. 235/379, 381

[56] References Cited

U.S. PATENT DOCUMENTS

| | | | |
|---|---|---|---|
| 4,016,405 | 4/1977 | McCunie | 235/379 |
| 4,023,012 | 5/1977 | Ano et al. | 235/379 |
| 4,166,945 | 9/1979 | Inoyama | 235/379 |

*Primary Examiner*—Harold I. Pitts
*Attorney, Agent, or Firm*—Bell, Seltzer, Park & Gibson

[57] ABSTRACT

The automatic self service machine system of this invention operates in an off-line manner without the necessity of a data communication link to a host computer and is characterized in that it does not require the issuance of special identification cards to users of the machine. Moreover, the system permits each user to employ any encoded machine readable card already in his possession as the authorization card or "key"0 for using the machine. The system also provides a unique portable storage cartridge for storage of articles to be dispensed or received by the machine, such as money, tickets, travelers checks, documents, and the like as well as data relating to the dispensing or receipt of such articles.

26 Claims, 4 Drawing Figures

AUTOMATIC SELF SERVICE MACHINE SYSTEM AND METHOD

BACKGROUND OF THE INVENTION

This invention relates to an automatic self service system and particularly to such a system which employs stand-alone machines for dispensing money, tickets or other articles of value and/or for receiving deposits, payment envelopes, articles such as mail to be delivered by a delivery service, or for carrying out other transactions.

Stand alone vending machine are known. Some of these machines will accept a credit card in payment for articles dispensed. An automatic teller machine is a special purpose vending machine which is now commonly used by banks for carrying out routine banking transactions, such as dispensing money or receiving deposits. These machines provide the customer with the convenience of being able to satisfy their banking needs at any time of day or night regardless of banking hours, and the machines also relieve the bank tellers of such routine transactions, thereby providing better utilization and efficiency of the banking staff.

However, one limitation to the use of automatic self service machines, such as teller machines, is their expense. Not only are the machines themselves costly, but they are expensive to operate since they typically must be continuously connected to a host computer via a data communication line in an "on-line" manner for instantly interchanging information regarding the transactions performed at the machine. Also, it is necessary for the owner of the machine to issue encoded machine readable identification cards and personal identification numbers to each customer, for enabling each customer to use the machines.

In an effort to overcome this limitation and reduce the cost of automatic teller systems, "stand-alone" automatic teller machines have been developed which operate in a "off-line" mode without the necessity of a continuous data communication link to a host computer. One way that these stand-alone systems may operate involves storing information concerning the customer's account and his balance on the encoded identification card itself. However, this has obvious drawbacks from the standpoint of security since it may be possible for a customer to alter the information contained on the card, and loss of the card would result in loss of the information.

Another approach which has been used for stand-alone automatic self service machine systems requires the loading into each machine of a separate data medium which contains information concerning the accounts authorized to transact business with the machine. The data medium typically is in the form of magnetically recorded diskettes or cassettes, and provides a positive (or negative) list of accounts authorized to conduct transactions at the machine. Transaction details are recorded on the data medium, and periodically the data is transmitted or transported to a host computer for processing and updating the customer's account. However, this approach suffers from the expense of issuing and maintaining special identification cards governing each customer's access to the machine. Additionally, the procedures and time involved in applying for and obtaining a card may discourage prospective new customers from using the machine. Others may object to the necessity of carrying around an extra card in addition to the numerous bank and store cards already in their possession.

The present invention overcomes these and other limitations and disadvantages of prior automatic self service machine systems. In accordance with one very significant and advantageous feature of the present invention, the necessity and attendant expense of issuing special identification cards is eliminated. The automatic machine of the present invention enables users to employ any machine readable card already in their possession as the identification card or "key" for gaining access to the machine.

The invention also provides a simplified method and means for a prospective new user to open an account and establish authorization for use of the machine, and thereby encourages the opening of accounts by new users.

The present invention also provides for an improved method and means of interchanging data between an off-line stand-alone automatic self service machine and a host system.

SUMMARY OF THE INVENTION

The automatic self service machine of the present invention includes suitable means, such as a display screen, for conveying information or instructions to the user on how to operate the machine, and a suitable keyboard where the user may enter information, such as identification numbers, passwords, or information relating to the banking transaction. The machine also includes a card reader for receiving a customer's identification card, and for reading encoded machine readable information therefrom.

One of the unique features of the machine system of this invention is that it does not require the issuance of special identification cards to the users of the machine. Moreover, the system permits each user to employ any encoded machine readable identification card already in his possession as the authorization card or "key" for gaining access to the machine.

Prospective users of the machine may make application to become an authorized user by inserting the encoded identification card into the card reader provided in the machine, and the identification number is read therefrom. The user is then prompted to enter an identification number or "password" known only to the user as a further security measure. Then the user may thereafter be prompted to enter appropriate credit information which would enable the owner or operator of the machine to ascertain the user's credit status. All of this information is stored, either in encrypted or unencrypted form, within the machine on a suitable data storage medium or memory means. When the machine is serviced, the data storage medium is removed and transported to a processing station, where all of this collected information relating to prospective users or applicants can be read, and decisions taken regarding which applicants will be approved. The approved users are then included on a list of authorized users stored on the data storage medium, and the data storage medium is returned to the machine so that the newly authorized users may thereafter use their identification cards to gain access to and carry out transactions at the machine.

Thus one aspect of the present invention involves a means and method of establishing user authorization to an automatic self service machine which avoids the necessity of issuing identification cards and permits the user to employ any machine readable identification card already in his possession. The method in accordance with the invention comprises the steps of:

prompting an applicant who desires to become an authorized user of the machine to insert into the machine an identification card already in the possession of the applicant and having encoded thereon unique identification data;

reading the identification data from the applicant's inserted card and storing the identification data in a memory provided in the machine;

prompting the applicant to enter credit information for use in establishing authorization to use the machine;

receiving entry by the applicant of the credit information and storing the same in the memory along with the identification data read from the applicant's card;

at a later time, reading from the memory the stored identification data and credit information entered by the applicants to determine which of the applicants will be authorized to use the machine; and storing in the memory identification data for those applicants who have been authorized to use the machine, so that the newly authorized applicants may thereafter use their identification cards to gain access to the machine.

The present invention also provides a unique and advantageous method and means to facilitate the servicing of the machines, the updating of the data storage medium, and the replenishment of the machine with articles to be dispensed, or collection of deposited items from the machine.

In accordance with this aspect of the present invention, the automatic self service machine of the present invention employs an integrated cartridge for storing and transportation of both the money or other articles received or dispensed by the machine, as well as data relating to the dispensing or receipt. The storage cartridge, more particularly, includes a first storage area for storing the articles to be received or dispensed and a second storage area for storage of information relating to the dispensing or receipt of articles in the cartridge. When used in an automatic teller machine, for example, the cartridge may be easily installed in the machine, and when so installed provides the machine with the necessary supply of money as well as supplying the machine with data needed for carrying out money dispensing and other transactions. The cartridge may also collect and store data or information relating to transactions occuring at the machine, so that these transactions can be recorded and processed when the cartridge is removed from the machine and returned to the processing station. Data which may be carried by the cartridge to be exchanged between the automated teller machine and the host system may include, but is not limited to: a list of customer accounts to be used to control the dispensing of money or the carrying out of other transactions, a log of transactions occuring at the automatic teller machine, information relating to new users who have made application to become authorized to use the machine, operating instructions for display by the automatic teller machine, error logs, operating statistics, programs, electronic keys, etc.

A portable storage cartridge of the type described above is used in a method of dispensing money and recording transactions in accordance with the present invention which comprises the steps of:

receiving identification data from a user who desires to obtain money from the teller machine;

comparing the identification data received from the user with information stored on portable storage cartridge located within the machine and having a first storage area for storage of money and a second storage area for storage of information relating to the dispensing of money;

dispensing money to the user from the cartridge if the identification data entered by the user matches that of the authorized user stored in the second storage area of the cartridge;

recording information relating to the money dispensing transaction in the second storage area of the cartridge;

periodically removing the storage cartridge from the teller machine and transporting the cartridge to a processing station, and while at the processing station reading the stored data relating to money dispensing transactions for reconciliation and processing to customer accounts, and replenishing the first storage area of the cartridge with money, and thereafter, returning the storage cartridge to the teller machine.

BRIEF DESCRIPTION OF THE DRAWINGS

Some of the features and advantages of the invention having been stated, others will become apparent from the detailed description which follows, when taken in connection with the accompanying drawings, in which.

DESCRIPTION OF THE ILLUSTRATED EMBODIMENT

Figure 1:
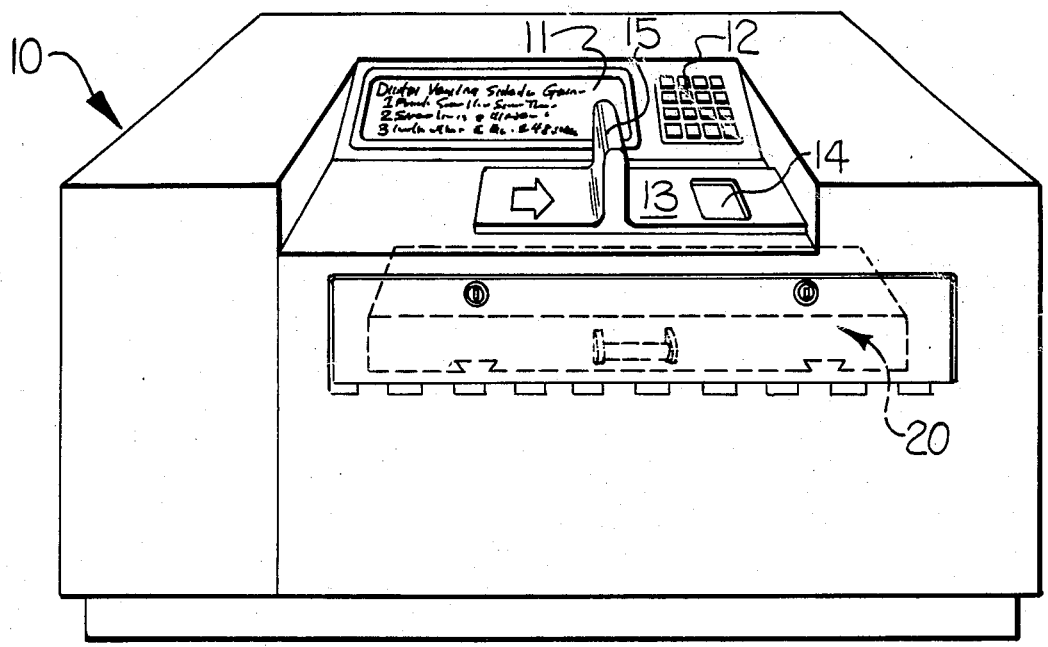
FIG. 1 is a perspective view of an automatic teller machine in accordance with the present invention.
Figure 2:
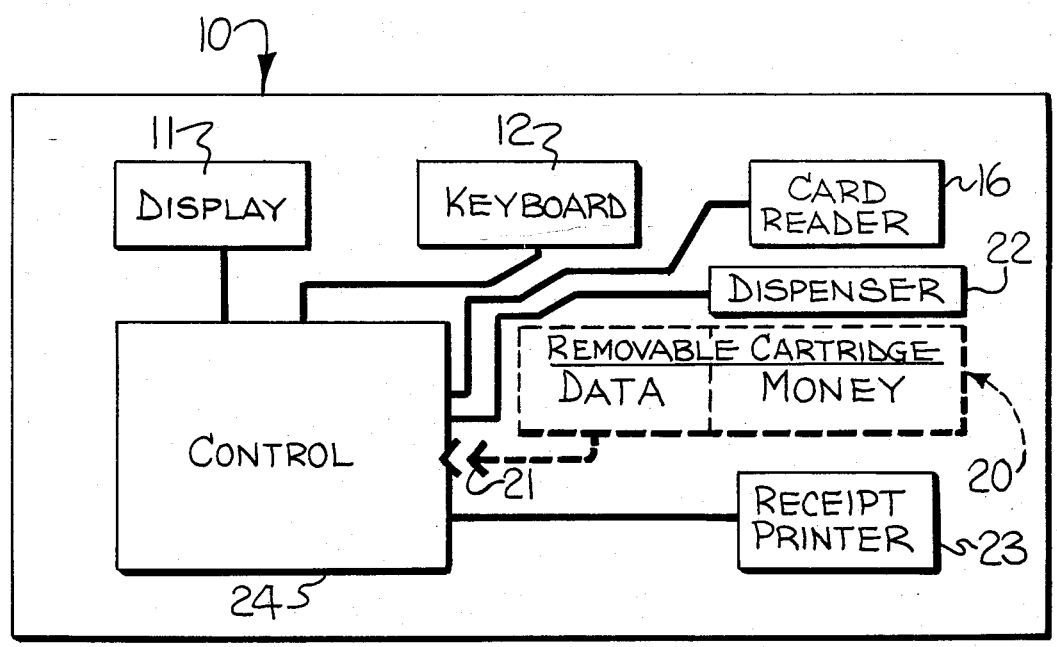
FIG. 2 is a schematic diagram of the internal components of the automatic teller machine.

Referring now more particularly to the drawings, FIG. 1 illustrates by way of example an automatic teller machine 10 in accordance with the present invention. It is understood that the invention is equally applicable to other self service vending or deposit receiving machines. The machine 10 includes a display screen 11 for conveying information or instructions to the user on how to operate the machine, and a suitable keyboard 12 where the user may enter information, such as identification numbers, or information relating to the banking transaction. Means is also provided for receiving a customer's identification card, and for reading therefrom information magnetically encoded on the card. As illustrated, the machine includes a slide member 13, having an opening or recess 14 therein for receiving the customer's identification card. A handle 15 provided on the slide permits the user to move the slide in the direction as shown in the arrow to move the card receiving recess 14 into the interior of the machine to permit reading of the magnetically encoded information from the card. A card reader, shown at 16 in FIG. 2, is appropriately located within the machine for reading the magnetically encoded information from the card as the card is moved thereby. Upon the completion of the transaction, when the slide 13 is moved back to the starting position, the money which is dispensed, together with a receipt, is returned to the user along with the user's identification card.

A portable storage cartridge in which money and pertinent information or data is stored is generally indicated by the reference character 20. As shown, the cartridge 20 is mounted within the machine 10, and can be removed therefrom through a door 19 conveniently located at the front or rear of the machine.

The internal elements of the machine are schematically represented in FIG. 2. The cartridge 20 includes a first portion or area 20a adapted for receiving and storing currency of a given denomination, such as five dollar bills, for example. Also provided in a second portion or area 20b of the cartridge 20 is a non-volatile memory means for receiving and storing information relating to the dispensing of money. Any suitable non-volatile memory device can be employed, such as for example a bubble memory, a battery-powered RAM, magnetic disc or tape, etc. or combinations of these. The cartridge 20 also includes suitable connectors 21 for providing an electrical connection between the memory means of the cartridge and a control unit 24 provided in the machine. A dispenser unit 22 cooperates with the first portion 20a of cartridge 20 for withdrawing money from the cartridge and dispensing it to the user during a money dispensing transaction. The machine also includes a receipt printer 23 for printing a receipt with information concerning the transaction carried out at the machine. As illustrated, the receipt printer 23, as well as the other components of the machine are connected to control unit 24 for controlling operation of the automatic teller machine. The control unit 24 may include a suitably programmed microprocessor.

Figure 3:
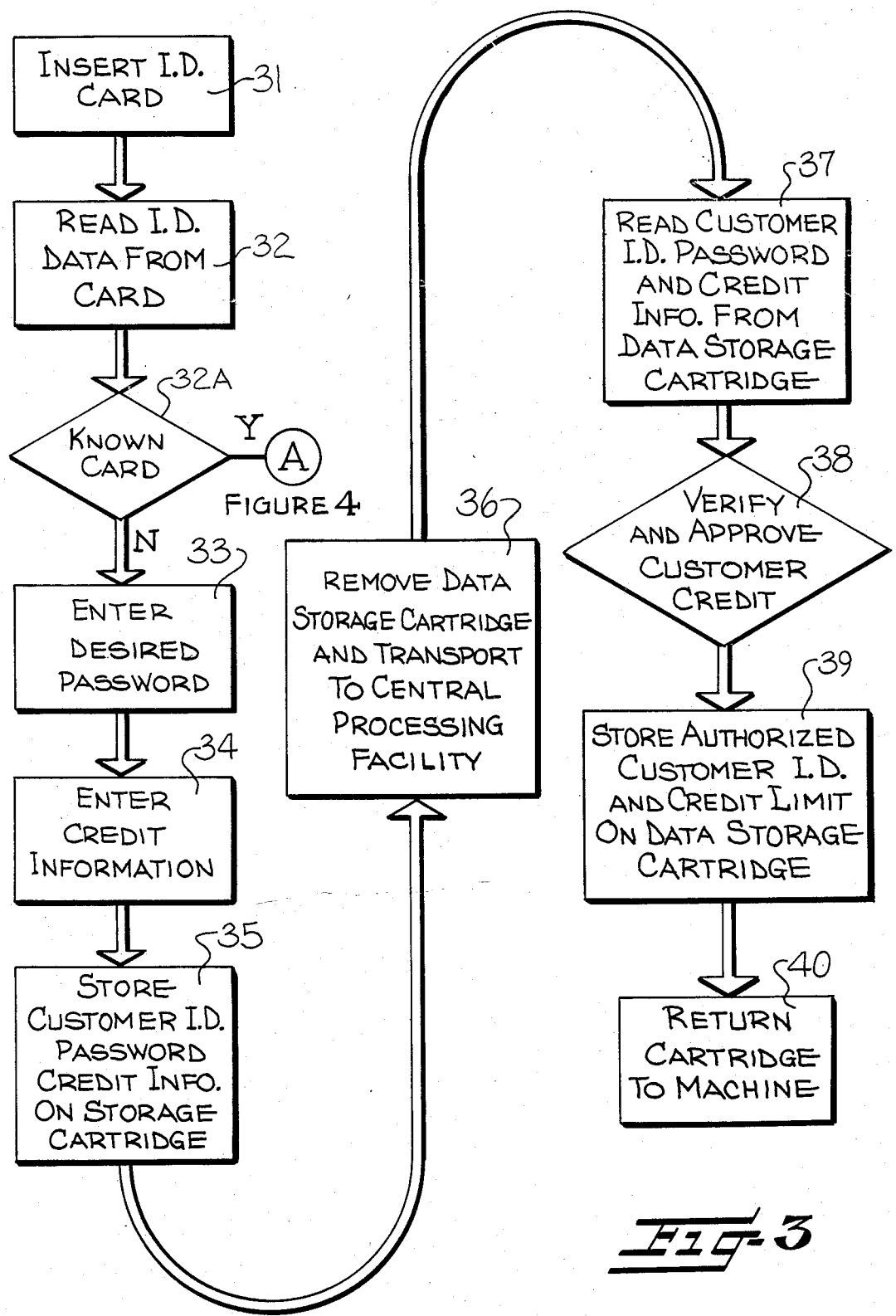
FIG. 3 is a flow chart illustrating how the automatic teller machine of this invention operates in establishing an account for a new user.
Figure 4:
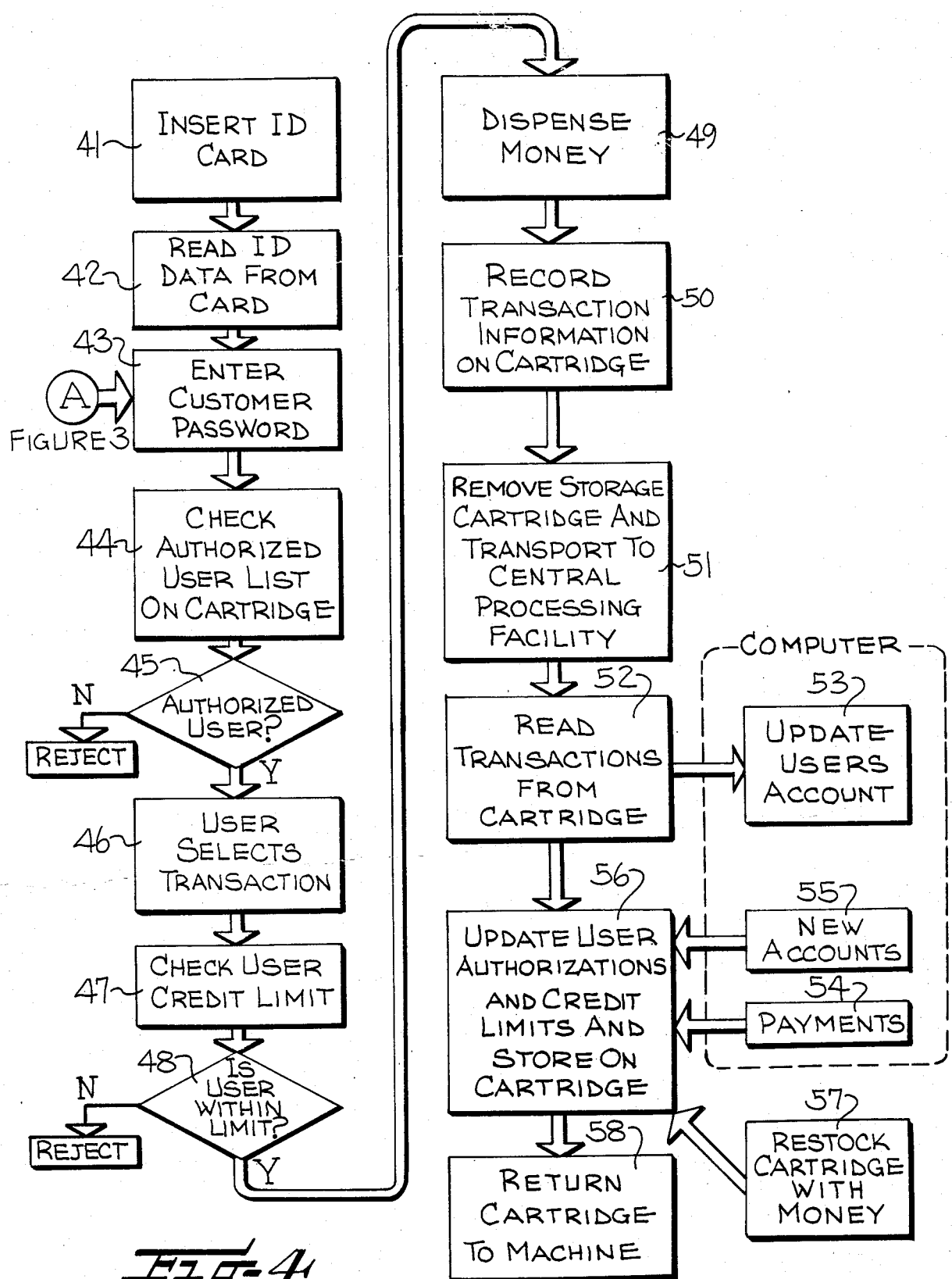
FIG. 4 is a flow chart illustrating how the automatic teller machine operates in carrying out a money dispensing transaction.

FIGS. 3 and 4 schematically illustrate how the automatic teller machine system is operated. To use the system, it is first necessary to open an account. Prospective users of the machine are prompted to enter appropriate identification information. As shown in FIG. 3 at 31, the prospective user or applicant must first insert into the card reader of the machine a card containing magnetically encoded information which is unique to the applicant and which will thereafter serve as the user's authorization card for using the machine. For an authorization card, the applicant may use any existing credit/debit card already in the user's possession. Such cards typically have a magnetic stripe on the rear surface thereof containing encoded information identifying the issuer of the card and the customer account number. The card is inserted in the card receiving slot 14 of the machine, as indicated at 31, and the machine reads the magnetically encoded identification therefrom (32). If the identification data read from the card matches that of an authorized card in the memory of the machine, the transaction proceeds as illustrated and described at "A" in FIG. 4, as indicated at 32a in FIG. 3. If the card is not a known card, then information (33) is displayed prompting the applicant to enter other identification information, such as a password, number, etc., which is known only to the applicant and is to be remembered by the applicant. When later using the machine, the user will be requested to enter this password or number. The applicant may then be requested to enter certain credit information (34). The particular credit information required may be determined by the owner of the machine. For example, the machine may request the applicant to insert other credit or bank cards which will then be read by the machine, or the applicant may be prompted to enter the name of his bank, account number, etc. All of this applicant credit information is stored in the memory means 20b provided in the cartridge 20, as indicated at 35.

Periodically, the machine is serviced and the cartridge is transported to a central processing facility, as indicated at 36. At this time the information provided by applicants and stored on the cartridge 20 can be read by the owner of the machine, as shown at 37, and the owner has the opportunity to verify the credit of the applicants (38) and to determine which of the applicants will be approved for using the machine and to issue credit limits for each. Identification data for the newly approved users are added to the list of approved users on the cartridge, as shown at 39. Thus, when this cartridge is returned to the machine (40), the new users will then be able to withdraw cash or carry out other approved transactions at the machine. To ensure that the correct cartridge is returned to the correct machine, each cartridge may be encoded with identification code means, and the machine may include means for reading this identification code from the cartridge when the cartridge is installed and for signalling if the identification code of the cartridge does not match that of the machine.

Considering now the cash dispensing transaction, as shown in FIG. 4, a customer desiring to withdraw cash from the machine inserts his previously authorized identification card (41) and the identification data is read therefrom (42). The customer then enters the appropriate identification information, e.g. password (43). As shown at 44-45, the machine then checks the memory means in cartridge 20 to see if the user is an authorized user. The customer then selects the type of transaction, e.g. withdrawal and indicates the amount (46), whereupon the machine checks whether the customer is within his credit limit (47, 48). If so, the machine then dispenses the requested amount of cash (49), and information concerning the cash dispensing transaction is recorded on the cartridge (50). Later, as indicated at 51, when the cartridge is removed from the machine and returned to the central processing facility, the connector 21 provided on the memory 20a is connected to a computer, and the data contained in the cartridge is read. As seen in FIG. 4, the recorded information relating to cash dispensing transactions is read from the cartridge 20 (52), and each customer's account is appropriately updated (53). At this time, it also is possible to update each user's credit limits, to take into account payments (54) that have been made, or non payments as the case may be, to remove from the list of authorized users any delinquent accounts, and to add any newly authorized users (55) to the list of approved users. All of this updated information is then stored on the cartridge 20, as indicated at 56. The cartridge is replenished with money (57), and is then ready to be returned to the machine (58) the next time that the machine is serviced.

In the drawings and specification, there has been set forth a preferred embodiment of the invention, and although specific terms are employed, they are used in a generic and descriptive sense only and not for purposes of limitation.

That which is claimed is:

1. An automated self service machine characterized by avoiding the necessity of issuing identification cards and permitting the user to employ any machine readable card already in his possession, said machine comprising
a card reader for reading encoded machine readable identification data from a card inserted into the machine, means for prompting an applicant who desires to become authorized to use the machine to insert into said card reader a card already in the possession of the applicant and having encoded thereon unique identification data; and memory means for storing the identification data read from the inserted card of applicant for later use in establishing authorization for the applicant to use the machine.

2. The automatic self service machine of claim 1 additionally including means for prompting the applicant to enter a password known only to the applicant; and means for receiving entry by the applicant of the password and for storing the same in said memory means along with the identification data read from the applicant's inserted card.

3. The automatic self service machine of claim 1 additionally including means for prompting the applicant to enter credit information for use in establishing authorization to use the machine; and means for receiving entry by the applicant of the credit information and for storing the same in said memory means along with the identification data read from the applicant's inserted card.

4. The automatic self service machine of claim 3 wherein said means for prompting the applicant to enter credit information includes means instructing the applicant to insert into said card reader a machine readable card issued by a credit reference, said card having encoded thereon identification data identifying the credit reference and the account number of the applicant, and said means for receiving entry of the credit information includes means for reading the encoded credit reference and account number information from the inserted card.

5. The automatic self service machine according to claim 1 wherein said memory means also has stored therein identification data for authorized users of the machine, and said machine additionally includes validation means operable upon insertion of an identification card and reading of the identification data therefrom by said card reader for comparing the identification data read from the inserted card with the identification data of authorized users stored in said memory means.

6. The automatic self service machine of claim 1 additionally including means for storing in said memory means data relating to transactions carried out by the machine.

7. The automatic self service machine of claim 1 particularly adapted for dispensing articles of value and including a storage cartridge removably mounted in said machine and including a first storage area for storing articles of value to be dispensed by the machine and a second storage area for storage of data relating to the dispensing of such articles.

8. The automatic self service machine of claim 1 particularly adapted for receiving and collecting articles deposited by the user and including a storage cartridge removably mounted in said machine and including a first storage area for receiving and storing articles deposited into the machine by the user and a second storage area for storage of data relating to the receipt of such articles.

9. An automatic self service machine characterized by avoiding the necessity of issuing identification cards and permitting the user to employ any machine readable identification card already in his possession, said apparatus comprising a card reader for reading identification data from an identification card inserted into the machine;

memory means having stored therein identification data relating to applicants who desire to become authorized to use the machine and also having stored therein identification data relating to authorized users of the machine;

means for prompting an applicant who desires to become authorized to use the machine to insert into said card reader a card already in the possession of the applicant and having encoded thereon unique identification data;

means for recording the identification data read from the applicant's inserted card in said memory means;

means for prompting an authorized user to insert an identification card and to enter a password known only to the authorized user; and means for comparing the identification data read from the identification card and the password entered by the user with the identification data of authorized users stored in said memory means and for authorizing a transaction by the machine if the card identification data and password match those of an authorized user; and means for storing in said memory means data relating to transactions carried out by the machine.

10. The automatic self service machine of claim 9 including a cartridge removably mounted in the teller machine, said memory means being mounted in said cartridge to thereby permit removal of the memory means from the machine.

11. An automatic self service machine according to claim 10 additionally comprising means for dispensing articles of value, and wherein said removable cartridge also includes means for storage of the articles to be dispensed.

12. An automatic self service machine according to claim 10 additionally comprising means for receiving articles deposited into the machine by the user, and wherein said removable cartridge also includes means for storage of the articles received.

13. An automatic teller machine comprising means for receiving identification data from a user, means for dispensing money to the user, and a storage cartridge cooperating with said data receiving means and with said money dispensing means, said storage cartridge having a first storage area for storing money to be dispensed and a second storage area for storage of information relating to the dispensing of money from the cartridge.

14. The machine of claim 13 further comprising applicant control means for gathering credit information from applicants who desire to become authorized to use the machine and for storing said credit information in said second storage area for later use in determining whether the applicant will be authorized to use the machine.

15. The machine of claim 13 further comprising dispensing control means responsive to authorized user information stored in said second storage area for dispensing money to users who have previously provided credit information to the machine and received authorization to use the machine.

16. The machine of claim 15 further comprising transaction recording means responsive to the dispensing of money for recording information concerning the money dispensing transaction in said second storage area.

17. An automatic teller machine system comprising
a money dispensing machine,
a processing station remote from said dispensing machine, and
a storage cartridge adapted for being physically transported between said dispensing machine and said processing station and including means for storage of money to be dispensed and means for storage of information relating to the dispensing of money therefrom,
said dispensing machine including means for receiving the storage cartridge during normal use of the machine and for dispensing money therefrom and for recording information on the storage cartridge relating to the money dispensed, and
said processing station including means for at times receiving said cartridge and for reading therefrom the recorded information relating to the money dispensed.

18. The system of claim 17 wherein said means in said cartridge for storage of information relating to the dispensing of money includes means for storage of information relating to users who are authorized to receive money from the dispensing machine, and means for storage of information relating to money dispensing transactions.

19. The system of claim 18 wherein said means in said cartridge for storage of information additionally includes means for storage of credit information from applicants who desire to become authorized to use the dispensing machine.

20. The system of claim 18 wherein said dispensing machine includes means for receiving identification data from a user, and means for comparing the user identification data which is received with data stored in said cartridge relating to users who are authorized to receive money from the dispensing machine.

21. The system of claim 17 wherein said dispensing machine further comprises control means for gathering credit information from applicants who desire to become authorized to use the dispensing machine and for storing said credit information in said cartridge.

22. The system of claim 17 including machine identification means in said storage cartridge for identifying the particular dispensing machine to which the storage cartridge belongs, and means in said dispensing machine responsive to the installation of a storage cartridge having a non-matching machine identification for signaling that the wrong storage cartridge has been installed in the dispensing machine.

23. A method of establishing user authorization to an automatic self service machine which avoids the necessity of issuing identification cards and permits the user to employ any machine readable card already in his possession, said method comprising
prompting an applicant who desires to become an authorized user of the machine to insert a card already in the possession of the applicant and having encoded thereon unique identification data;
reading the identification data from the applicant's inserted card and storing the identification data in a memory provided in the machine;
prompting the applicant to enter credit information for use in establishing authorization to use the machine;
receiving entry by the applicant of the credit information and storing the same in the memory along with the identification data read from the applicant's card;
reading from the memory the stored identification data and credit information entered by the applicants to determine which of the applicants will be authorized to use the machine; and
storing in the memory identification data for those applicants who have been authorized to use the machine, so that the newly authorized applicants may thereafter use their identification cards to gain access to the machine.

24. A method according to claim 23 including the step of periodically removing the memory from the machine and transporting the memory to a processing station, and wherein said steps of reading from the memory the stored identification data and credit information entered by the applicants, and the step of storing in the memory identification data for those applicants who have been authorized to use the machine are performed while the memory is removed from the machine and at the processing station, and including the step of returning the memory to the processing machine after said reading and storing steps have been carried out.

25. A method of establishing user authorization to an automatic self service machine which avoids the necessity of issuing identification cards and permits the user to employ any machine readable card already in his possession, said method comprising
prompting an applicant who desires to become an authorized user of the machine to insert a card already in the possession of the applicant and having encoded thereon unique identification data;
reading the identification data from the applicant's inserted card and storing the identification data on a transportable data storage medium;
transporting the data storage medium with the identification data of applicants recorded thereon to a processing station, and while at the processing station processing the identification data of the applicants and recording on the transportable data storage medium identification data for those applicants who have been authorized to use the machine; and
transporting the data storage medium with the updated identification data for newly authorized users back to the machine so that the newly authorized users may thereafter use their identification cards to gain access to the machine.

26. A method of dispensing money and recording transactions at an automatic teller machine comprising
receiving identification data from a user who desires to obtain money from the teller machine;
comparing the identification data received from the user with information stored on a portable storage cartridge located within the machine and having a first storage area for storage of money and a second storage area for storage of information relating to the dispensing of money;
dispensing money to the user from the cartridge if the identification data entered by the user matches that of an authorized user stored in said second storage area of the cartridge;
recording information relating to the money dispensing transaction in said second storage area of the cartridge;
periodically removing the storage cartridge from the teller machine and transporting the cartridge to a processing station, and while at the processing station reading the stored data relating to money dispensing transactions for processing to customer accounts, and replenishing the first storage area of the cartridge with money, and
returning the storage cartridge to the teller machine.

* * * * *